United States Patent
Lee et al.

(10) Patent No.: US 11,140,663 B2
(45) Date of Patent: Oct. 5, 2021

(54) D2D OPERATION METHOD OF TERMINAL IN WIRELESS COMMUNICATION SYSTEM, AND TERMINAL USING METHOD

(71) Applicant: LG ELECTRONICS INC., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 16/500,059

(22) PCT Filed: Apr. 3, 2018

(86) PCT No.: PCT/KR2018/003938
§ 371 (c)(1),
(2) Date: Oct. 1, 2019

(87) PCT Pub. No.: WO2018/186667
PCT Pub. Date: Oct. 11, 2018

(65) Prior Publication Data
US 2020/0059915 A1 Feb. 20, 2020

Related U.S. Application Data

(60) Provisional application No. 62/544,754, filed on Aug. 11, 2017, provisional application No. 62/492,165, (Continued)

(51) Int. Cl.
*H04W 72/04* (2009.01)
*H04W 56/00* (2009.01)
(Continued)

(52) U.S. Cl.
CPC ... *H04W 72/0406* (2013.01); *H04W 56/0015* (2013.01); *H04W 72/02* (2013.01); *H04W 92/18* (2013.01)

(58) Field of Classification Search
CPC ............ H04W 72/0406; H04W 72/02; H04W 56/0015; H04W 76/14; H04W 92/18;
(Continued)

(56) References Cited

U.S. PATENT DOCUMENTS

2010/0195586 A1* 8/2010 Choi ................... H04W 72/042
370/329
2015/0098422 A1 4/2015 Sartori et al.
(Continued)

FOREIGN PATENT DOCUMENTS

KR 10-2016-0146703 A 12/2016

OTHER PUBLICATIONS

LG Electronics, "Discovery enhancement for IoT and wearables", R1-1704858, 3GPP TSG RAN WG1 Meeting #88bis, Spokane, USA, Apr. 3-7, 2017, see section 2.2; and figure 1.
(Continued)

*Primary Examiner* — Maharishi V Khirodhar
*Assistant Examiner* — Kenneth P Hunt
(74) *Attorney, Agent, or Firm* — Dentons US LLP

(57) ABSTRACT

Provided are a device to device (D2D) operation method of a terminal in a wireless communication system, and a terminal using the method. In the method, the terminal receives, from another terminal which is the object of a D2D operation, first information and performs the D2D operation on the basis of the first information, wherein the first information indicates a specific resource in which the other terminal cannot receive a signal transmitted from the terminal, and the terminal performs the D2D operation within the remaining resources excluding the specific resource.

14 Claims, 16 Drawing Sheets

Related U.S. Application Data filed on Apr. 29, 2017, provisional application No. 62/481,034, filed on Apr. 3, 2017.

(51) Int. Cl.
*H04W 72/02* (2009.01)
*H04W 92/18* (2009.01)

(58) Field of Classification Search
CPC ... H04W 72/048; H04W 72/00; H04W 72/04; H04W 72/044; H04W 72/0493; H04W 72/12–14; H04W 8/005; H04B 7/15542
See application file for complete search history.

(56) References Cited

U.S. PATENT DOCUMENTS

| | | | | |
|---|---|---|---|---|
| 2015/0257184 A1* | 9/2015 | Yamazaki | ............ | H04L 5/0044 370/329 |
| 2015/0296443 A1* | 10/2015 | Lim | ............ | H04W 48/12 370/312 |
| 2016/0037547 A1* | 2/2016 | Yang | ............ | H04N 7/15 370/329 |
| 2017/0013655 A1* | 1/2017 | Martin | ............ | H04L 5/0094 |
| 2017/0135143 A1* | 5/2017 | Suda | ............ | H04W 72/0453 |
| 2018/0092112 A1* | 3/2018 | Jung | ............ | H04W 72/10 |
| 2018/0132086 A1* | 5/2018 | Zhang | ............ | H04W 4/70 |
| 2018/0270776 A1* | 9/2018 | Yasukawa | ............ | H04W 56/0015 |

OTHER PUBLICATIONS

LG Electronics, "Communication enhancement for IoT and wearable", R1-1704859, 3GPP TSG RAN WG1 Meeting #88bis, Spokane, USA, Apr. 3-7, 2017, see section 2.2.

Intel Corporation, "Considerations on Sidelink Discovery Enhancements for Wearable and IoT Use Cases", R1-1704705, 3GPP TSG RAN1 WG Meeting #88bis, Spokane, USA, Apr. 3-7, 2017, see sections 2.2, 2.3.

Huawei et al., "Discussion on efficient discovery", R1-1704307, 3GPP TSG RAN WG1 Meeting #88bis, Spokane, USA, Apr. 3-7, 2017, see section 2.

* cited by examiner

UE (1420)　　　Vehicle (1410)　　　Base station (1430)

D2D OPERATION METHOD OF TERMINAL IN WIRELESS COMMUNICATION SYSTEM, AND TERMINAL USING METHOD

This application is the National Stage filing under 35 U.S.C. 371 of International Application No. PCT/KR2018/003938, filed on Apr. 3, 2018, which claims the benefit of U.S. Provisional Application Nos. 62/481,034 filed on Apr. 3, 2017, 62/492,165 filed on Apr. 29, 2017, and 62/544,754 filed on Aug. 11, 2017, the contents of which are all hereby incorporated by reference herein in their entirety.

BACKGROUND

Field of the Disclosure

The present disclosure relates to wireless communication and, most particularly, to a D2D operation method of a terminal (or user equipment) in a wireless communication system and a terminal using the method.

Related Art

In the International Telecommunication Union Radio (ITU-R) communication sector, standardization of International Mobile Telecommunication (IMT)-Advanced, which corresponds to a next generation mobile communication system following the 3' generation communication system. The IMT-Advanced aims to support internet protocol (IP)-based multimedia services at a data transmission rate of 1 Gbps during a fixed connection state or low-speed mobile connection state and at a data transmission rate of 100 Mbps during a high-speed mobile connection state.

As a system standard that satisfies the requirements of the IMT-Advanced, 3rd Generation Partnership Project (3GPP) is currently preparing for LTE-Advanced (LTE-A), which corresponds to an enhanced version of the Long Term Evolution (LTE), which is based on the Orthogonal Frequency Division Multiple Access (OFDMA)/Single Carrier-Frequency Division Multiple Access (SC-FDMA) transmission schemes. Herein, the LTE-A corresponds to one of the most promising candidates for the IMT-Advanced.

Recently, rising attention has been directed towards the Device-to-Device (D2D) technology, wherein direct communication is performed between multiple devices. Most particularly, D2D is drawing attention as a communication technology for public safety network. Although commercial communication networks are evolving (or shifting) to LTE at a fast rate, due to contentions with the legacy communication standard and cost issues, the current public safety network is mostly based on the 2G technology. Due to such technical gap and requirement for enhanced services, efforts are being made for enhancing the public safety network.

There may occur a case where a user equipment (UE) (or terminal) having limited frequency band capability suspends its D2D operation, which was initially being performed, due to diverse purposes. Accordingly, the present disclosure proposes a D2D operation method that can allow the UE having the limited frequency band capability to perform the D2D operations more smoothly (or easily) and to reduce power consumption.

SUMMARY OF THE DISCLOSURE

Technical Objects

A technical object that is to be achieved by the present disclosure is to provide a D2D operation method of a terminal (or UE) in a wireless communication system, and a terminal (or UE) using the method.

Technical Solutions

In one aspect, a device to device (D2D) operation method of a first user equipment (UE) in a wireless communication system is provided. The method is comprising receiving first information, by the first UE, from a second UE, the second UE being a target of the D2D operation, and performing the D2D operation based on the first information, wherein the first information notifies a specific resource through which the second UE is incapable of receiving a signal transmitted from the first UE, and wherein the first UE performs the D2D operation within remaining resources excluding the specific resource.

The first UE may have a greater bandwidth capability than the second UE.

The specific resource may not include a resource for a Sidelink Synchronization Signal (SLSS) being transmitted by the first UE.

The first UE may determine a time resource pattern by considering only the remaining resources excluding the specific resource.

The first UE may determine a time resource pattern by including the specific resource, and the D2D operation may not be performed in a resource where the time resource pattern and the specific resource overlay one another.

The specific resource may include a resource through which a specific signal having a value equal to or greater than a threshold value is received.

The specific signal may correspond to a synchronization signal being transmitted from a base station.

When performing the D2D operation, in a pre-configured frequency band, discovery may be performed at a higher priority level than communication.

Within a pre-configured resource, the D2D operation may be performed at a higher priority level than an uplink communication being performed by the first UE.

Information on the pre-configured resource may be transmitted to the second UE.

When performing the D2D operation, if the first UE receives a discovery signal from the second UE through a physical layer, the discovery signal and a first resource pool through which the discovery signal is received may be delivered to an upper layer of the first UE, whether or not to transmit, from the upper layer, a discovery model and a response signal corresponding to the discovery signal to the second UE may be determined, and if the response signal is to be transmitted from the upper layer, the response signal and information on a second resource pool through which the response signal is to be transmitted may be delivered to the physical layer.

The first UE may select a resource pool being used for performing the D2D operation by the second UE, and the selection result may be transmitted to a base station.

In another aspect, a device to device (D2D) operation method of a second user equipment (UE) in a wireless communication system is provided. The method is comprising determining reception or non-reception of a D2D signal transmitted from a first UE, and in case the D2D signal reception is failed, transmitting reception failure information to the first UE, wherein the reception failure information notifies a resource through which the second UE is incapable of performing the D2D operation, and wherein the reception failure information is differentiated from reception failure information being based on a link quality.

In another aspect, a communication method of a second user equipment (UE) in a wireless communication system is provided. The method is comprising receiving D2D resource information from a first UE, selecting a specific resource based on the D2D resource information, and receiving a signal being transmitted by a base station from the specific resource, wherein the D2D resource information indicates a resource through which the first UE intends to transmit a D2D signal to the second UE, and wherein the specific resource does not include a resource being indicated by the D2D resource information.

In another aspect, provided is a user equipment (UE), comprising a transceiver transmitting and receiving radio signals, and a processor being operatively coupled with the transceiver, wherein the processor is configured to receive first information, by the UE, from another UE, the other UE being a target of the D2D operation, and to perform the D2D operation based on the first information, wherein the first information notifies a specific resource through which the other UE is incapable of receiving a signal transmitted from the UE, and wherein the UE performs the D2D operation within remaining resources excluding the specific resource.

Effects of the Disclosure

According to the present disclosure, a UE having limited frequency band capability may easily perform D2D operations without experiencing any interference, and power consumption of the UE that may be caused interference may be reduced. Thus, more power-efficient D2D operations may be performed.

BRIEF DESCRIPTION OF THE DRAWINGS

FIG. 13 shows an example for describing an exemplary embodiment to which FIG. 12 is applied.

DESCRIPTION OF EXEMPLARY EMBODIMENTS

Figure 1:
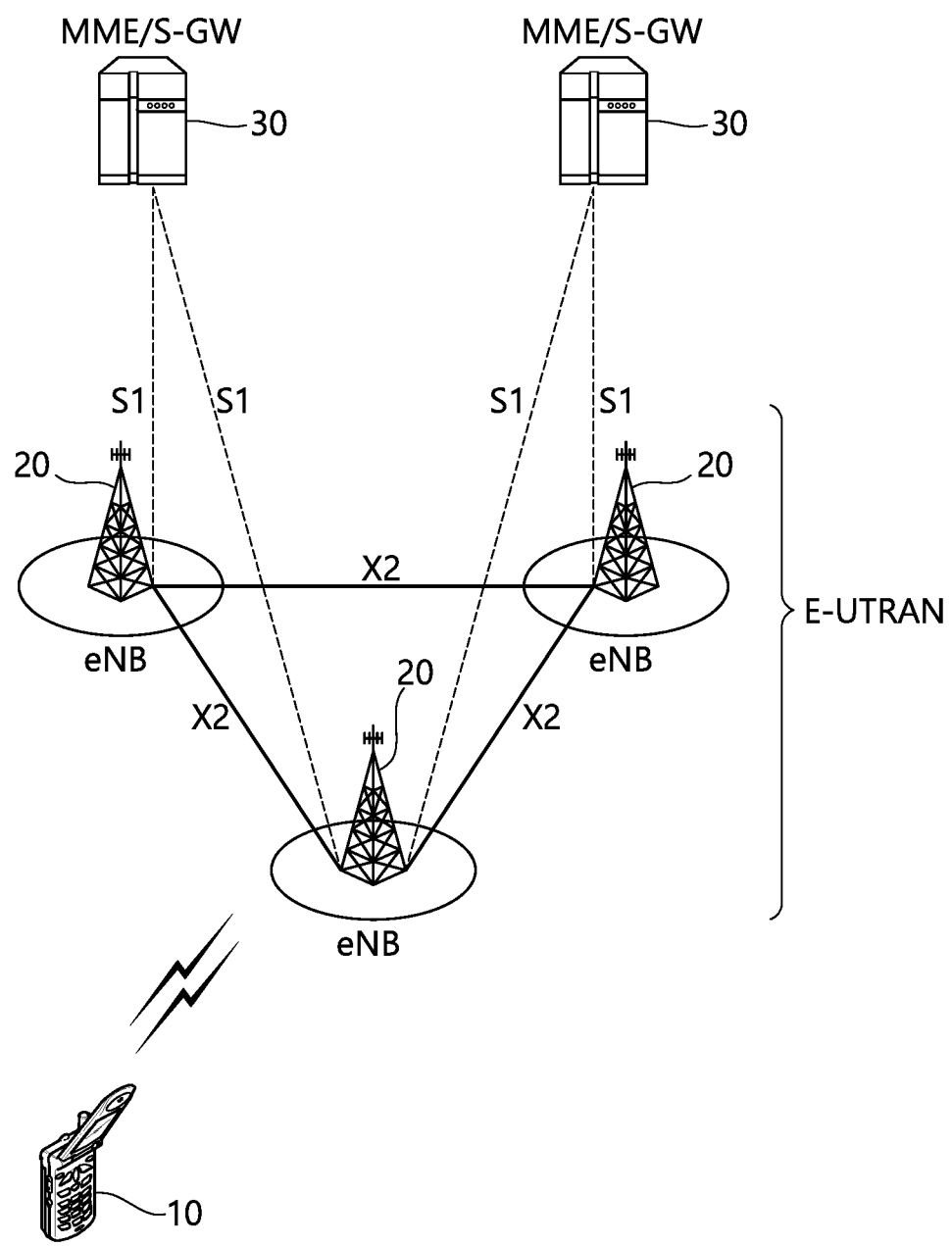
FIG. 1 shows a wireless communication system.

FIG. 1 shows a wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
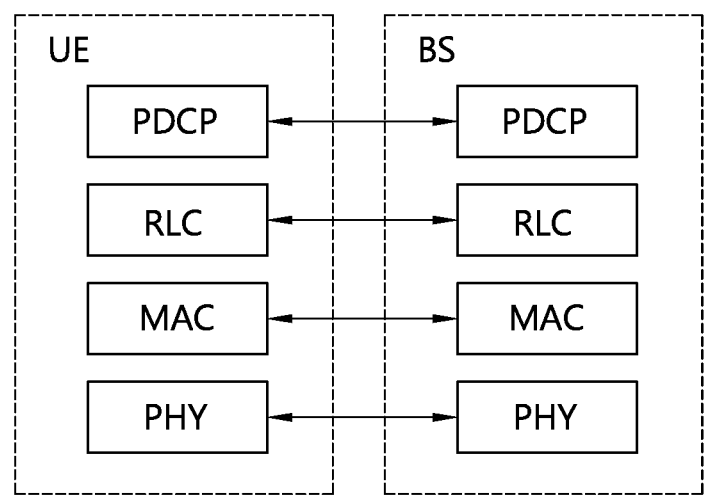
FIG. 2 is a diagram showing a wireless protocol architecture for a user plane.
Figure 3:
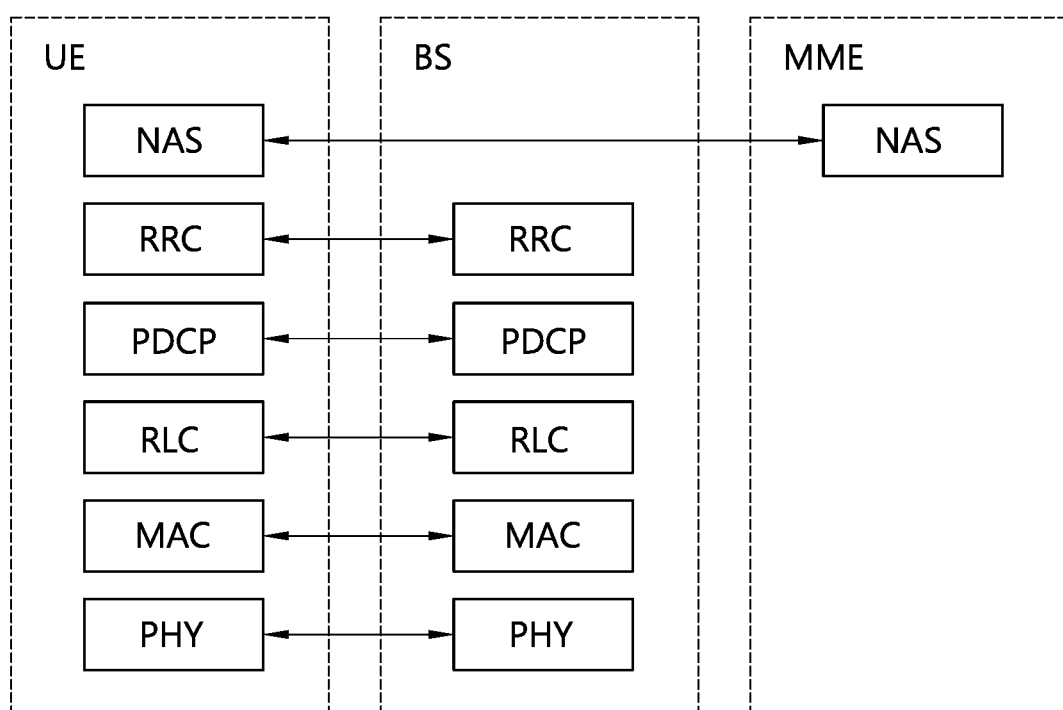
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

In what follows, a new radio access technology (RAT) will be described. The new radio access technology may also be called a new radio for short.

As more and more communication devices require a larger communication capacity, needs for improved mobile broadband communication over conventional radio access technologies (RATs) are emerging. Also, massive Machine Type Communication (MTC) which connects a plurality of devices and objects to each other and provides various services anytime and anywhere is also one of important issues that need to be considered in the next-generation communication. In addition, a new communication system design is under consideration, which takes into account services or terminals sensitive to reliability and latency; adoption of the next-generation radio access technology which supports enhanced mobile broadband communication, massive MTC, Ultra-Reliable and Low Latency Communication (URLLC), and so on is under consideration, which, for the purpose of convenience, is referred to as a new RAT or new radio (NR) in the present disclosure.

Figure 4:
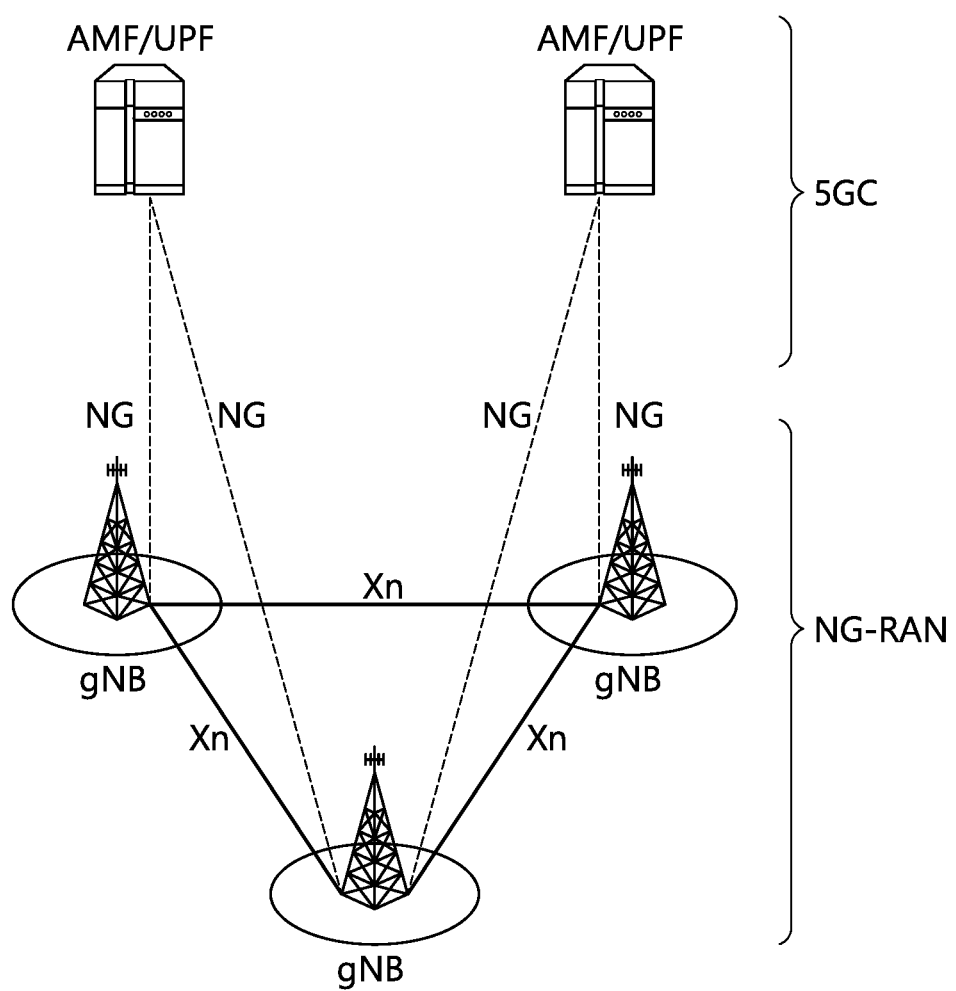
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, NG-RAN may include a gNB and/or eNB which provides a UE with the user plane and control plane protocol termination. FIG. 4 illustrates the case where only the gNB is included. The gNB and the eNB are connected to each other through the Xn interface. The gNB and the eNB are connected to the 5G core network (5GC) through the NG interface. More specifically, the gNB and the eNB are connected to the access and mobility management function (AMF) through the NG-C interface and to the user plane function (UPF) through the NG-U interface.

Figure 5:
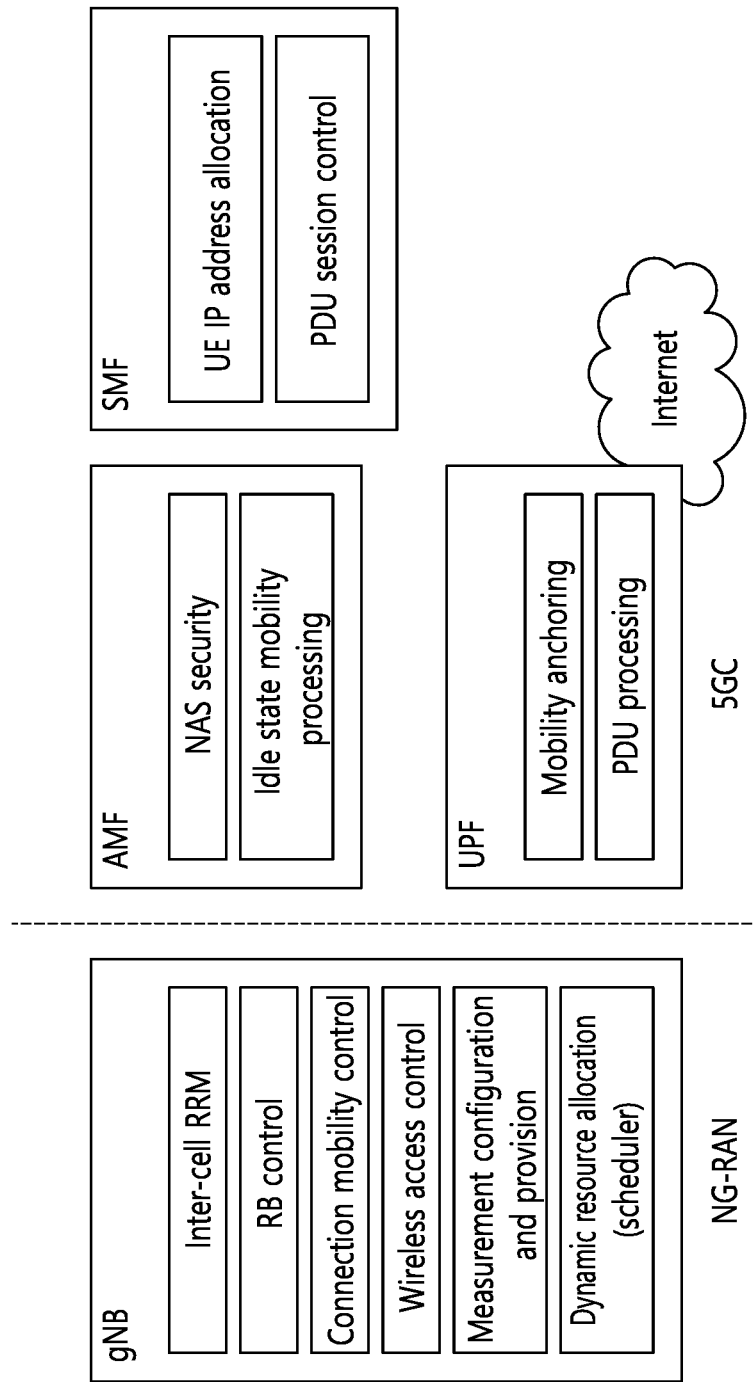
FIG. 5 illustrates a functional division between the NG-RAN and the 5GC.

FIG. 5 illustrates a functional division between the NG-RAN and the 5GC.

Referring to FIG. 5, the gNB may provide functions such as inter-cell radio resource management (RRM), radio bearer (RB) management, connection mobility control, radio admission control, measurement configuration & provision, and dynamic resource allocation. The AMF may provide such functions as NAS security and idle state mobility processing. The UPF may provide such functions as mobility anchoring and PDU processing. The Session Management Function (SMF) may provide functions such as allocation of UE IP address and PDU session control.

Figure 6:
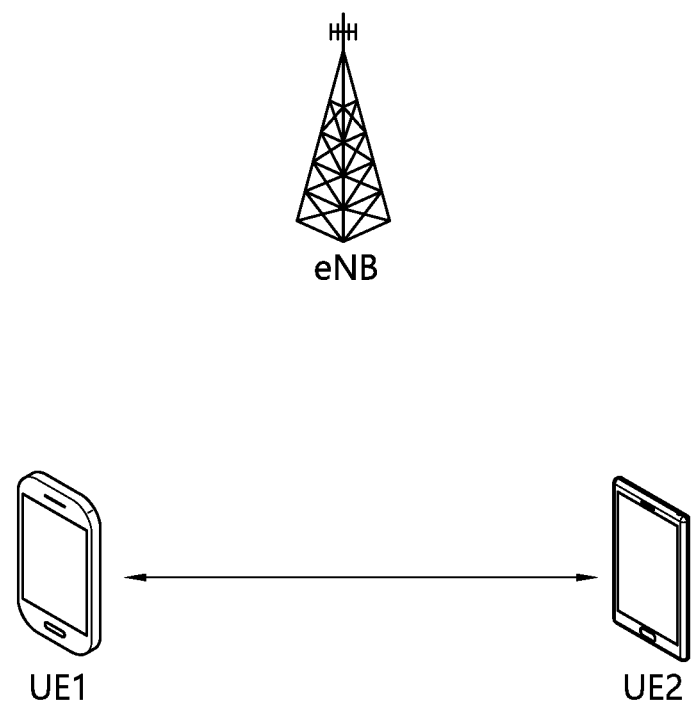
FIG. 6 illustrates UEs performing V2X or D2D communication.

FIG. 6 illustrates UEs performing V2X or D2D communication.

Referring to FIG. 6, in the V2X/D2D communication, the term UE primarily refers to a user terminal. However, when a network device such as an eNB transmits and receives a signal according to a communication scheme employed for UEs, the eNB may also be regarded as a kind of terminal.

UE 1 may operate to select a resource unit corresponding to a specific resource within a resource pool which is a set of series of resources and to transmit a D2D signal by using the corresponding resource unit. UE 2, which is a UE receiving the D2D signal, may be configured for a resource pool to which the UE 1 may transmit a signal and detect the signal transmitted from the UE 1 within the corresponding resource pool.

At this time, if the UE 1 is within coverage of an eNB, the eNB may inform the UE 1 of the resource pool. On the other hand, if the UE 1 lies outside the coverage of the eNB, other UE may inform the UE 1 of the resource pool, or a predetermined resource may be utilized.

In general, a resource pool consists of a plurality of resource units, and each UE may select one or more resource units to transmit its D2D signal.

Figure 7:
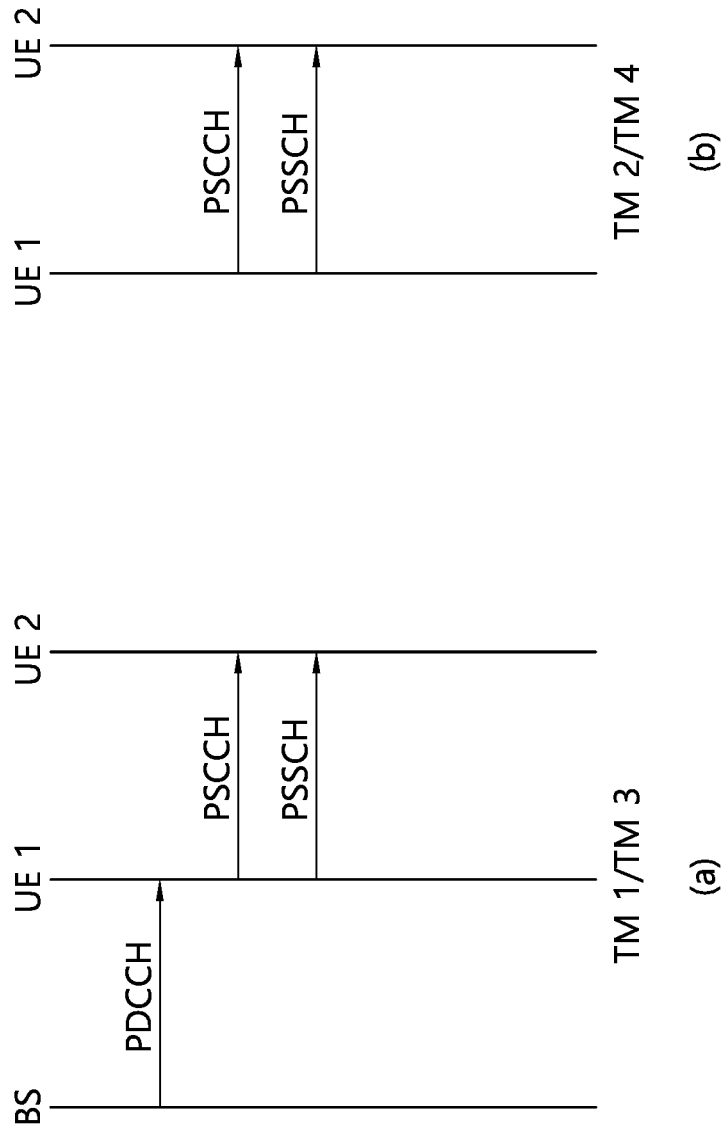
FIG. 7 illustrates a UE operation according to the transmission mode (TM) related to V2X/D2D communication.

FIG. 7 illustrates a UE operation according to the transmission mode (TM) related to V2X/D2D communication.

FIG. 7(*a*) is related to transmission mode 1, 3 while FIG. 7(*b*) is related to transmission mode 2, 4. In the transmission mode 1, 3, an eNB performs resource scheduling for UE 1 through PDCCH (more specifically, DCI), and the UE 1 performs D2D/V2X communication with UE 2 according to the corresponding resource scheduling. After transmitting Sidelink Control Information (SCI) to the UE 2 through a Physical Sidelink Control Channel (PSCCH), the UE 1 may transmit data based on the SCI through a Physical Sidelink Shared Channel (PSSCH). The transmission mode 1 may be applied to D2D communication while the transmission mode 3 may be applied to V2X communication.

The transmission mode 2, 4 may be referred to as a mode in which a UE performs scheduling autonomously. More specifically, the transmission mode 2 may be applied to D2D communication, and a UE may select a resource by itself within a set resource pool to perform a D2D operation. The transmission mode 4 may be applied to V2X communication, and a UE may select a resource by itself within a selection window through a process such as sensing/SA decoding, after which the UE may perform a V2X operation. After transmitting SCI to the UE 2 through the PSCCH, the UE 1 may transmit data based on the SCI through the PSSCH. In what follows, the transmission mode may be referred to as a mode.

While the control information transmitted by an eNB to a UE through the PDCCH is called downlink control information (DCI), the control information transmitted by a UE to other UEs through the PSCCH may be called SCI. The SCI may be expressed in various formats, for example, SCI format 0 and SCI format 1.

The SCI format 0 may be used for scheduling of the PSSCH. The SCI format 0 may include a frequency hopping flag (1 bit), resource block allocation and hopping resource allocation field (the number of bits of which may differ depending on the number of resource blocks of a sidelink), time resource pattern (7 bit), modulation and coding scheme (MCS) (5 bit), time advance indication (11 bit), and group destination ID (8 bit).

The SCI format 1 may be used for scheduling of the PSSCH. The SCI format 1 may include priority (3 bit), resource reservation (4 bit), frequency resource position of initial transmission and retransmission (the number of bits of which may differ depending on the number of sub-channels of a sidelink), time gap between initial transmission and retransmission (4 bit), MCS (5 bit), retransmission index (1 bit), and reserved information bit. In what follows, the reserved information bit may be called a reserved bit for short. Reserved bits may be added until the bit size of the SCI format 1 becomes 32 bit. In other words, the SCI format 1 includes a plurality of fields, each of which has different information from each other, where the number of remaining bits excluding the total number of bits of the plurality of fields from the total number of fixed bits (32 bit) of the SCI format 1 may be called reserved bits.

The SCI format 0 may be used for the transmission mode 1, 2 while the SCI format 1 may be used for the transmission mode 3, 4.

Figure 8:
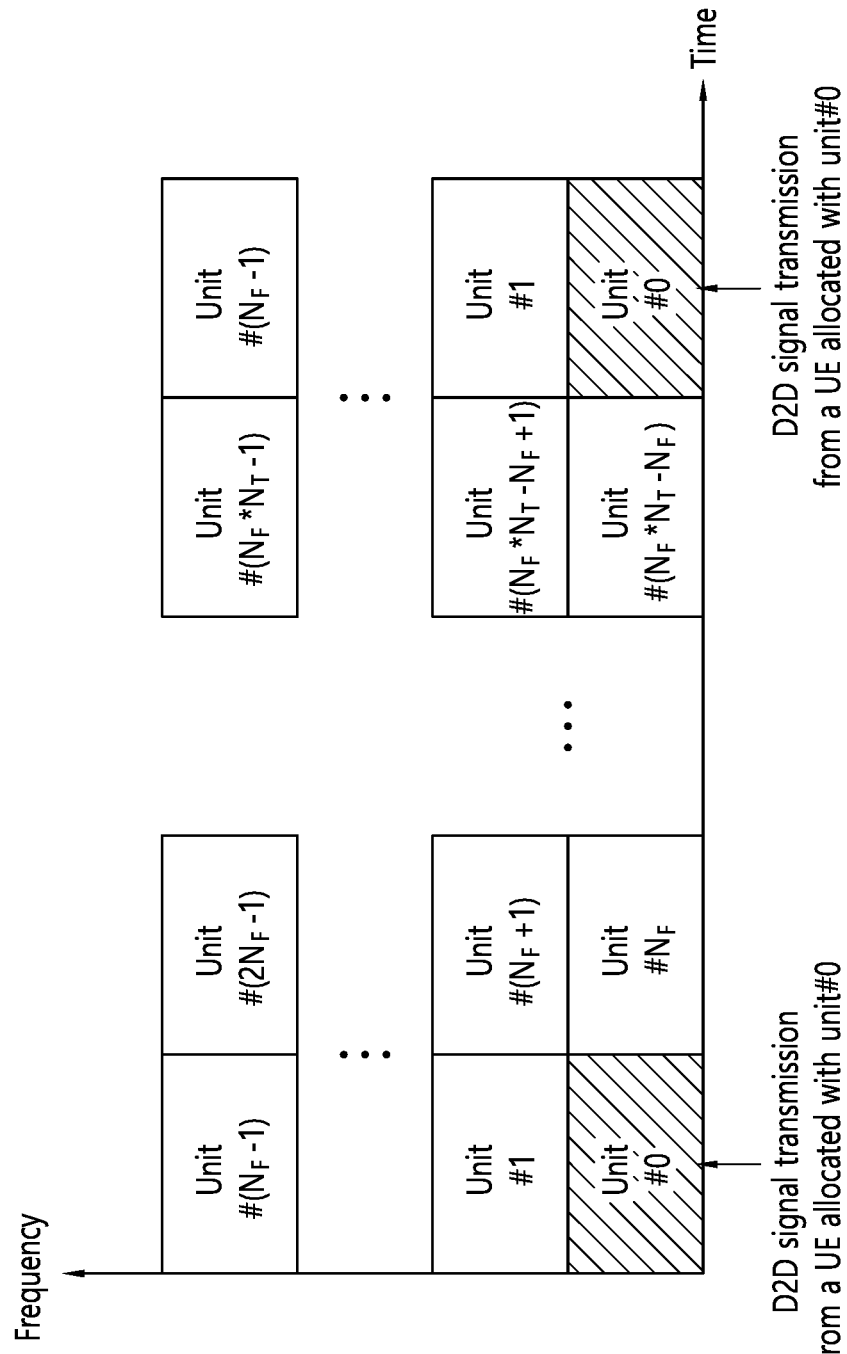
FIG. 8 illustrates an example of a configuration of resource units.

FIG. 8 illustrates an example of a configuration of resource units.

Referring to FIG. 8, the entire frequency resources of a resource pool may be divided into $N_F$ units, and the entire time resources of the resource pool may be divided into $N_T$ units, by which a total of $N_F \times N_T$ resource units may be defined within the resource pool.

At this time, it is assumed that the corresponding resource pool is repeated with a period of $N_T$ subframes.

As shown in FIG. 8, one resource unit (for example, Unit #0) may appear repeatedly at regular intervals. Similarly, to obtain a diversity effect in the time or frequency dimension, the index of a physical resource unit to which one logical resource unit is mapped may vary according to a predetermined pattern as time elapses. In the aforementioned resource unit structure, a resource pool may indicate a set of resource units available for transmission, which may be used by a UE attempting to transmit a D2D signal.

A resource pool may be subdivided into various types. For example, the resource pool may be classified according to the content of a D2D signal transmitted from each resource pool. Each resource pool may be classified as follows, where each resource pool may transmit a D2D signal of which the content is described below.

1) Scheduling Assignment (SA) resource pool or D2D (sidelink) control channel: A resource pool by which each transmitting UE transmits a signal including information about the resource position of a D2D data channel transmitted from a succeeding or the same subframe and information required for demodulation of the other data channels (for example, information about modulation and coding scheme (MCS), MIMO transmission scheme, and timing advance).

The signal described in 1) may be transmitted together with D2D data after being multiplexed on the same resource unit. In this case, an SA resource pool may indicate a resource pool to which SA is transmitted by being multiplexed with D2D data. The SA resource pool may also be called a D2D (sidelink) control channel.

2) D2D data channel: A resource pool by which a transmitting UE transmits user data by using a resource designated through SA. If it is possible that D2D data and SA information are multiplexed and transmitted together on the same resource unit, a resource pool for a D2D data channel may transmit only the D2D data channel in such a way to exclude the SA information. In other words, the D2D data channel resource pool still uses the resource element which has been used for transmitting SA information on the basis of individual resource units within the SA resource pool.

3) Discovery channel: A resource pool for messages by which a transmitting UE transmits information such as its identity (ID) so that a neighboring UE may discover the transmitting UE.

Even if a D2D signal carries the same content as described above, a different resource pool may be utilized depending on the transmission and reception attributes of the D2D signal. As one example, even if the same D2D data channel or the same discovery message is transmitted, the resource pool may be further classified into another different resource pool depending on a scheme for determining transmission timing of the D2D signal (for example, whether the D2D signal is transmitted at the time of receiving a synchronization reference signal or transmitted after a predetermined timing advance is applied at the time of receiving the synchronization reference signal), resource allocation scheme (for example, whether a transmission resource of an individual signal is allocated by an eNB for each individual transmitting UE or whether an individual transmitting UE selects an individual signal transmission resource by itself within the resource pool), signal format (for example, the number of symbols occupied by each D2D signal in one subframe or the number of subframes used for transmission of one D2D signal), strength of a signal from the eNB, or transmission power intensity of a D2D UE).

As described above, the method in D2D communication for indicating a transmission resource of a D2D transmitting UE directly by the eNB may be called a mode 1 while the method for selecting a transmission resource directly by the UE, where a transmission resource region is predetermined or the eNB designates the transmission resource region, may be called a mode 2.

In the case of D2D discovery, the case where the eNB directly indicates a resource may be referred to as type 2 while the case where the UE directly selects a transmission resource from a predetermined resource region or a resource region indicated by the eNB may be referred to as type 1.

Meanwhile, the D2D may also be called sidelink. The SA may also be called a physical sidelink control channel (PSCCH), and D2D synchronization signal may also be called a sidelink synchronization signal (SSS). A control channel which transmits the most basic information before initiation of D2D communication is referred to as a physical sidelink broadcast channel (PSBCH), where the PSBCH may be transmitted together with an SSS and may alternatively called a physical D2D synchronization channel (PD2DSCH). A signal notifying that a specific UE is located in the vicinity may include an ID of the specific UE, and a channel to which such a signal is transmitted may be called a physical sidelink discovery channel (PSDCH).

In the D2D communication, only the D2D communication UE transmits a PSBCH together with an SSS, and in this reason, measurement of an SSS has been performed by using a demodulation reference signal (DM-RS) of the PSBCH. A UE in the out-coverage area may measure the DM-RS of the PSBCH and measure reference signal received power (RSRP) of the signal to determine whether the UE itself operate as a synchronization source.

Hereinafter, FeD2D (Further enhancement Device-to-Device) will be described.

The normative RAN work on enabling Proximity Services was started in LTE Rel. 12 with focus on Public Safety applications. The major features standardized in LTE Rel. 12 will be described below.

Device-to-device discovery in network coverage (both Commercial and Public Safety use cases).

Device-to-device broadcast communication, with higher layers supporting groupcast and unicast communication for within/partial and out of network coverage scenarios mainly targeting Public Safety use cases.

There is a lot of interest to use LTE technology to connect and manage low cost MTC devices. One important example of such low cost devices are wearables, which also have the benefit of almost always being in close proximity to a smartphone that can serve as a relay. Therefore, the study for the application of D2D to such devices including non-3GPP short-range technologies is ongoing, and also in particular there are two main aspects to be further enhanced in LTE technology to enable D2D aided wearable and MTC applications.

Enhancement of UE-to-Network relaying functionality:
The UE-to-Network relaying architecture in ProSe does not differentiate the traffic of the remote UE from that of the relay UE in the access stratum. This model limits the ability of the network and the operator to treat the remote UE as a separate device, e.g. for billing or security. In particular, the 3GPP security associations never reach end-to-end between the network and the remote UE, meaning that the relay UE has clear text access to the remote UE's communications. UE-to-Network relaying should be enhanced to support end-to-end security through the relay link, service continuity, E2E QoS where possible, efficient operation with multiple remote UEs, and efficient path switching between Uu and D2D air-interfaces. Relaying using D2D can also be based on non-3GPP technologies such as Bluetooth and Wi-Fi. Some enhancements such as service continuity can make relaying more attractive for such technologies in commercial use cases. This can be especially useful to wearables due to their usage patterns with proximity to the user's smartphone, as well as form-factor limitations that may make a direct Uu connection less practical (e.g. limits on battery size). Relaying can enable significant power savings for remote UEs (that are getting their traffic relayed). This is especially true for deep coverage scenarios. One cost effective way of introduce relaying is to use unidirectional D2D links between remote devices and relay devices. In this case, the relay UE is utilised to relay only uplink data from the remote UE. The advantage of this approach is no additional RF capability for D2D reception is added to the remote UE.

Enhancements to enable reliable unicast PC5 link to at least support low power, low rate and low complexity/cost devices. Low cost D2D devices can be enabled by reusing the ideas developed during NB-IoT (Narrow Band-IoT) and eMTC studies, e.g., the NB-IoT/eMTC uplink waveform can be reused for D2D. Such devices will potentially use a single modem for communicating with the Internet/cloud and for communicating with proximal devices. The current PC5 link design inherited from the broadcast oriented design driven by public safety use cases, represents a bottleneck that prevents low power and reliable D2D communication, due to lack of any link adaptation and feedback mechanisms. These shortcomings do not allow achieving target performance metrics for wearable and MTC use cases in terms of power consumption, spectrum efficiency, and device complexity. Reduced power consumption and low complexity are the key attributes of wearable and MTC use cases that are typically characterized by small form factors and long battery lifetime.

Hereinafter, the sidelink RSSI (Sidelink Received Signal Strength Indicator; S-RSSI), PSSCH Reference Signal Received Power (PSSCH-RSRP), Channel Busy Rate (CHANNEL BUSY RATIO; CBR), Channel Occupancy Rate (CHANNEL OCCUPANCY RATIO (CR) will be described.

<S-RSSI>

Sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe.

Herein, the reference point for the S-RSSI may be the antenna connector of the UE.

If receiver diversity is in use by the UE, the reported value may not be lower than the corresponding S-RSSI of any of the individual diversity branches.

S-RSSI is applicable for RRC_IDLE intra-frequency, RRC_IDLE inter-frequency, RRC_CONNECTED intra-frequency, and/or RRC_CONNECTED inter-frequency.

<PSSCH-RSRP>

PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH.

Herein, the reference point for the PSSCH-RSRP may be the antenna connector of the UE.

If receiver diversity is in use by the UE, the reported value may not be lower than the corresponding PSSCH-RSRP of any of the individual diversity branches.

PSSCH-RSRP is applicable for RRC_IDLE intra-frequency, RRC_IDLE inter-frequency, RRC_CONNECTED intra-frequency, and/or RRC_CONNECTED inter-frequency.

Herein, the power per resource element may be determined from the energy received during the useful part of the symbol, excluding the CP.

<CBR>

Channel busy ratio (CBR) measured in subframe n is defined as follows.

For PSSCH, CBR may be the portion of sub-channels in the resource pool whose S-RSSI measured by the UE exceed a (pre-)configured threshold sensed over subframes [n−100, n−1].

For PSCCH, in a pool (pre)configured such that PSCCH may be transmitted with its corresponding PSSCH in non-adjacent resource blocks, CBR may be the portion of the resources of the PSCCH pool whose S-RSSI measured by the UE exceed a (pre-)configured threshold sensed over subframes [n−100, n−1], assuming that the PSCCH pool is composed of resources with a size of two consecutive PRB pairs in the frequency domain.

CBR is applicable for RRC_IDLE intra-frequency, RRC_IDLE inter-frequency, RRC_CONNECTED intra-frequency, and/or RRC_CONNECTED inter-frequency.

Herein, the subframe index may be based on physical subframe index.

<CR>

Channel occupancy ratio (CR) evaluated at subframe n may be defined as follows.

CR may be the total number of sub-channels used for its transmissions in subframes [n−a, n−1] and granted in subframes [n, n+b] divided by the total number of configured sub-channels in the transmission pool over [n−a, n+b].

CR is applicable for RRC_IDLE intra-frequency, RRC_IDLE inter-frequency, RRC_CONNECTED intra-frequency, and/or RRC_CONNECTED inter-frequency.

Herein, a may be a positive integer and b may be 0 or a positive integer. a and b may be determined by UE implementation with a+b+1=1000, a >=500, and n+b should not exceed the last transmission opportunity of the grant for the current transmission.

Herein, CR may be evaluated for each (re)transmission.

Herein, in evaluating CR, the UE may assume the transmission parameter used at subframe n is reused according to the existing grant(s) in subframes [n+1, n+b] without packet dropping.

Herein, the subframe index may be based on physical subframe index.

Herein, CR can be computed per priority level.

Hereinafter, the present disclosure will be described in more detail.

For example, the following proposed methods propose a method for efficiently performing communication between a REMOTE UE and a RELAY-UE. Herein, for example, in the present disclosure, the "REMOTE-UE" wording may be interpreted (at least) as a UE having transmission (and/or reception) capability of a (relatively) limited band size (as compared to the RELAY-UE) (e.g., 6(/1) RB). Herein, for example, a D2D(/V2X) communication mode may be (mainly) differentiated as (A) a communication mode wherein the base station signals(/controls) D2D(/V2X) message transmission(/reception) related scheduling information (within a D2D(/V2X) resource pool being pre-configured(/signaled) (from the base station(/network)) (e.g., herein, a UE being located within a base station communication coverage (and/or being in a RRC_CONNECTED state) is the main target (or object)), and/or (B) a communication mode wherein the UE (independently) determines (/controls) D2D(/V2X) message transmission(/reception) related scheduling information (within a D2D(/V2X) resource pool being pre-configured(/signaled) (from the base station(/network)) (e.g., herein, a UE being located within/outside of a base station communication coverage (and/or being in a RRC_CONNECTED/IDLE state) is the main target (or object). Herein, for example, in the present disclosure, the "sensing operation" wording may be interpreted as a PSSCH DM-RS SEQUENCE based PSSCH-RSRP measurement operation (scheduled by a PSCCH that has successfully performed decoding) and/or a (D2D(/V2X) resource pool related sub-channel based)S-RSSI measurement operation, and so on (ref. Table 3.1). Herein, for example, in the present disclosure, the "reception" wording may be (extendedly) interpreted as (at least) one of (A) a D2D(/V2X) channel(/signal) (e.g., PSCCH, PSSCH, PSBCH, PSSS/SSSS, and so on) decoding(/reception) operation (and/or a WAN DL channel(/signal) (e.g., PDCCH, PDSCH, PSS/SSS, and so on) decoding(/reception) operation and/or (B) a sensing operation and/or (C) a CBR measurement operation. Herein, for example, in the present disclosure, the "transmission" wording may be (extendedly) interpreted as a D2D(/V2X) channel(/signal) (e.g., PSCCH, PSSCH, PSBCH, PSSS/SSSS, and so on) transmission operation (and/or a WAN DL channel(/signal) (e.g., PUSCH, PUCCH, SRS, and so on) transmission operation). Herein, for example, in the present disclosure, the "CARRIER" wording may be (extendedly) interpreted as (A) a pre-configured(/signaled) CARRIER SET(/GROUP) and/or (B) a D2D(/V2X) resource pool, and so on. Herein, for example, in the present disclosure, the "RS" wording may be interpreted (at least) as a DM-RS. Herein, for example, in the present disclosure, the "scrambling" wording may be interpreted (at least) as PSSCH(/PSCCH) scrambling. Additionally, herein, the Sidelink Received Signal Strength Indicator (RSSI) (S-RSSI), the PSSCH Reference Signal Received Power (PSSCH-RSRP), the Channel Busy Ratio (CBR), and the Channel Occupancy Ratio (CR) have already been described above.

For example, in a situation where a remote UE, which is relatively located further away from the base station, delivers its data to the base station by using relaying operations provided by a relay UE, which is located relatively closer to the base station, although the data generated from the remote UE undergoes a relaying process, a Uni-Directional Relay reference to a situation where data, which is generated from a network and which reaches (or arrives at) the base station, is directly delivered to the remote UE without any relaying process. More specifically, the remote UE transmits data that is/are to be transmitted to a relay station via sidelink, and the relay UE then transmits the data to the base station via uplink. The base station immediately transmits the data that is to be transmitted to the remote UE via downlink without performing any relaying operations. Since the remote UE performs transmission to a near-ranged relay UE by using a low power level, such Uni-Directional Relay operation is advantageous in that battery consumption may be reduced while the downlink continuously performs reception, thereby reducing time delay in the downlink data. Additionally, a sidelink is generally configured of a same or similar waveform in a same frequency domain as an uplink. However, although it is simple for a UE having uplink transmission capability to be additionally provided with a sidelink transmission capability, this may result in a considerable amount of embodiment cost for providing the UE with a separate sidelink reception function. At this point, when performing the Uni-Directional Relay, since the remote UE does not require to be equipped with a sidelink reception capability, the manufacturing (or embodiment) cost may be reduced.

Figure 9:
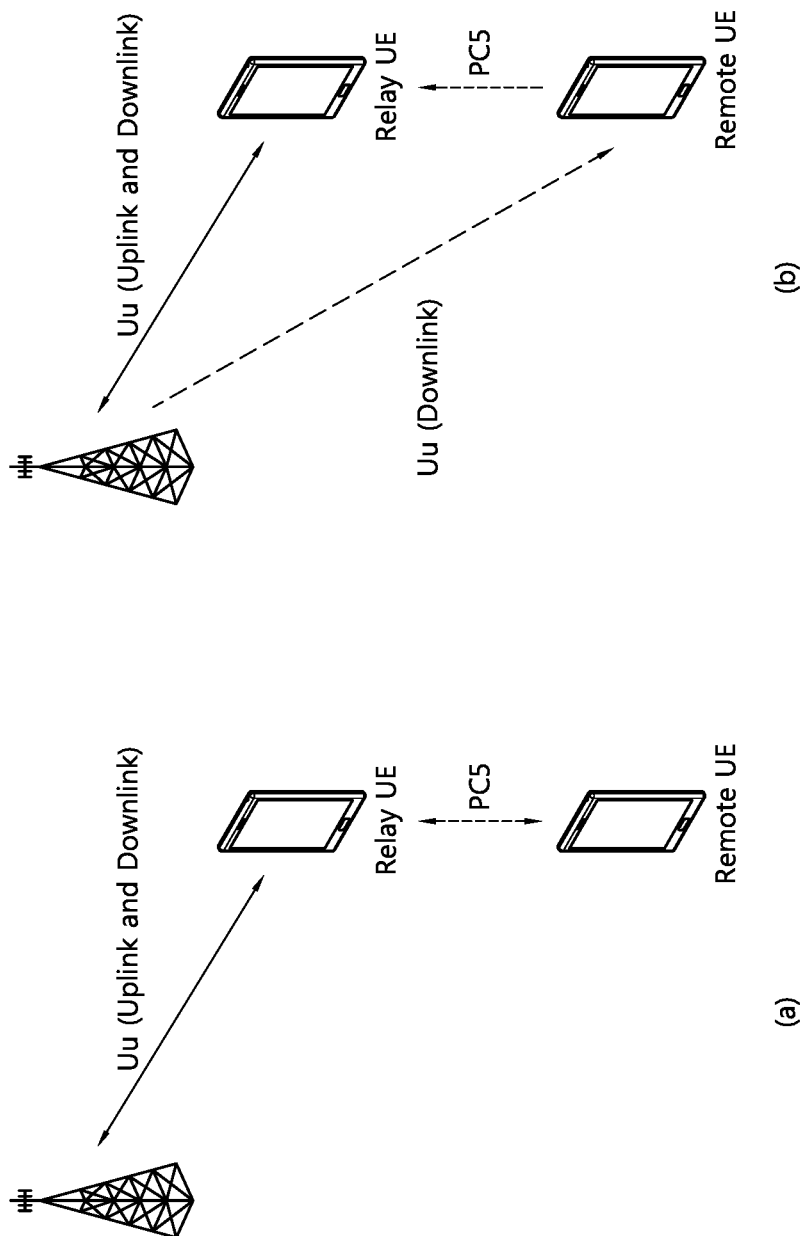
FIG. 9 respectively shows exemplary general views of a uni-directional relay and a bi-directional relay.

FIG. 9 respectively shows exemplary general views of a uni-directional relay and a bi-directional relay.

FIG. 9(a) shows an exemplary general view of a bi-directional relay. According to FIG. 9(a), a base station and a relay UE are capable of performing uplink and downlink communication, which are both based on a Uu interface. Additionally, a relay UE and a remote UE are capable of performing sidelink communication between one another. Herein, the sidelink communication is based on a PC5 interface. More specifically, the relay UE relays both uplink and downlink UE-specific data of the remote UE.

FIG. 9(b) shows an exemplary general view of a uni-directional relay. According to FIG. 9(b), just as in the above-described case of the bi-directional relay, the base station and the relay UE are capable of performing uplink and downlink communication that are both based on the Uu interface. Herein, although the remote UE is capable of performing direct downlink communication from the base station, in case of the uplink communication, a relay via the relay UE is required. More specifically, the relay UE relays the uplink data of the remote UE.

Although it is not separately shown in the drawing, unlike FIG. 9(b), the uni-directional relay may also be configured as a relay type designated only for downlink data of a remote UE.

For example, meanwhile, in order to allow a DOWNLINK between the base station and the REMOTE UE and a SIDELINK between the REMOTE UE and the RELAY UE to be smoothly performed, FEEDBACK information on the corresponding LINK is needed. The FEEDBACK information may include the following information listed below.

DATA DECODING RESULT: This corresponds to information indicating success or failure in DECODING the DATA that is received through a LINK, and a main example of this information corresponds to an HARQ-ACK. When a receiving end sends this information as FEEDBACK to the transmitting end, the transmitting end may perform re-transmission in response to the DATA that has failed to be processed with DECODING.

MEASUREMENT RESULT: This corresponds to information indicating quality of the corresponding LINK, and examples of such information includes REFERENCE SIGNAL RECEIVED POWER (RSRP), REFERENCE SIGNAL RECEIVED QUALITY (RSRQ), CHANNEL STATUS INFORMATION (CSI), PATHLOSS, and so on. When the receiving end measures this information and transmits the measured result to the transmitting end as FEEDBACK, the transmitting end uses the information to adjust the amount of resource or MODULATION AND CODING SCHEME to an optimal level best-fitting the corresponding LINK quality.

In case of the above-described UNI-DIRECTIONAL RELAY, an adequate design of such FEEDBACK is needed. This is because, when one DEVICE performs transmission to another DEVICE, transmission in an opposite direction is not authorized (or allowed), and only RELAYING can be performed through a third DEVICE. In case of a DOWNLINK, since FEEDBACK information generated by the REMOTE UE cannot be directly delivered to the base station, the corresponding information may only be delivered through the RELAY UE.

For example, an example of UE capability related to uni-directional/bi-directional relaying operations or an exemplary mechanism for efficiently supporting such relaying operations.

Evolved UE-to-NW Relay UEs support all DL/UL/SL system bandwidth capabilities (i.e. system BW from 1.4 MHz and above is supported).

Also, two types of Remote UEs are considered.

Type 1: UEs that have DL and SL reception capabilities.

Type 2: UEs that do not have SL reception capabilities.

Also, low complexity Remote UEs can have single RX chain. Herein, in unidirectional relaying case, the chain can be fixed to DL or FFS switched to SL for discovery. Also herein, in bidirectional relaying case, the receiver chain may be switched between DL and SL for discovery and communication.

Also, in-coverage Relay UE can serve as a synchronization source for in-coverage Remote UE.

Also, the following enhancements for sidelink unicast communication are studied further:

eNB controlled resource allocation and configuration for communication between Relay and Remote UE. Herein, eNB decision on resource allocation is relayed to Remote UE by Relay UE.

Relay UE assisted resource allocation and configuration under eNB control.

Remote UE assisted resource allocation.

Also, no new sidelink physical channel to be introduced solely to provide feedback. Herein, piggyback in existing channels is not precluded.

Also, study the following feedback information to be exchanged between the receiving and transmitting UEs for sidelink link adaptation.

Decoding status, taking into account the impacts on complexity and Remote UE power consumption.

Adaptation of MCS, number of (re)transmissions and resource for transmission. Herein, sidelink CSI feedback can be considered.

SL measurements e.g. SL-RSSI/RSRP/RSRQ.

Also, sidelink power control taking into account propagation characteristics between Relay UE and Remote UE is further studied. Herein, propagation characteristics can include sidelink pathloss, received signal quality, interference level etc.

Also, three sidelink resource configuration options are further analysed.

TDM between PSCCH/PSSCH from UE and system perspective (Similar to R12).

FDM between PSCCH/PSSCH from UE and system perspective (Similar to R14).

FDM between PSCCH/PSSCH from system perspective but TDM from UE perspective.

Meanwhile, for example, the following situations may be considered.

For diverse reasons, such as a case where a narrow-band remote-UE (M-UE) (e.g., 6RB) is (A) required to (directly) receive a specific signal (e.g., a synchronization signal, paging, system information (SIB/PBCH), (pathloss measurement specific) RS, and so on) being transmitted from a (serving) base station, or (B) required to measure a pathloss between the base station and the UE in order to calculate an upper bound of a sidelink transmission (TX) power, or (C) required to perform measurement of Radio Resource Management (RRM) of a neighboring cell (or adjacent cell) (e.g., Intra(/Inter)-Freq. RRM Measurement), a problem may occur in that the communication with a relay-UE (R-UE) may be intermittently suspended. (For example, this is because a receiver chain is (temporarily) switched so as to be used for downlink reception (RX).)

Herein, for example, for simplicity in the description of the present disclosure, resource (e.g., subframe) through which the M-UE cannot receive a signal being transmitted from the R-UE (for the above-described reason(s)) may be referred to as a "DRX-RSC".

Additionally, for example, a DRX-RSC may be configured(/signaled) for the purpose of (M-UE) power saving, and, for this, (part of) the proposed methods of the present disclosure may be extendedly applied. Herein, for example, when a (conventional) "Keep Alive Message" transmission/reception is performed between the R-UE and the M-UE, the DRX-RSC information for the power saving purpose may also be signaled along with the "Keep Alive Message".

Additionally, for example, (A) in case the R-UE is incapable of receiving a signal that is transmitted from the M-UE (and/or in case the R-UE is incapable of performing signal transmission to the M-UE) because the R-UE has been pre-defined in advance, or (B) in case the M-UE is incapable of performing signal transmission to the R-UE because the M-UE has been pre-defined in advance, (part of) the proposed methods of the present disclosure may also be extendedly applied in order to handle such cases.

In other words, when performing D2D operations between a UE having limited frequency band capability (e.g., wearable devices, and so on) and a UE that does not, in order to establish synchronization with a base station, the UE having limited frequency band capability may be required to receive a signal being transmitted from the base station in order to acquire system information. Alternatively, in order to perform sidelink transmission power compensation that is based on a pathloss measurement between the UE and the base station, the UE having limited frequency band capability may be required to perform the pathloss measurement. Alternatively, the UE having limited frequency band capability may be required to perform RRM measurement of an adjacent (or neighboring) cell. Herein, in case the UE, which intends to perform the above-described operation, corresponds to a UE having limited frequency band capability, the UE having limited frequency band capability may be required to suspend its D2D operation with a UE being the target (or object) of the D2D operation. In this case, interference may occur on the D2D operation that was initially being performed.

Additionally, in the aspect of power consumption, the UE having limited frequency band capability may have more limited power capability as compared to the UE that does not. In this case, if the above-described interference of the D2D operation occurs, this may cause a more critical problem to the UE having limited frequency band capability.

More specifically, as described above, a case where the UE having limited frequency band capability suspends the D2D operation, which was initially being performed, due to diverse purposes may occur. Accordingly, the present disclosure proposes a D2D operation method that can enable the UE having limited frequency band capability to perform smooth D2D operations without any interference or that can reduce power consumption.

Figure 10:
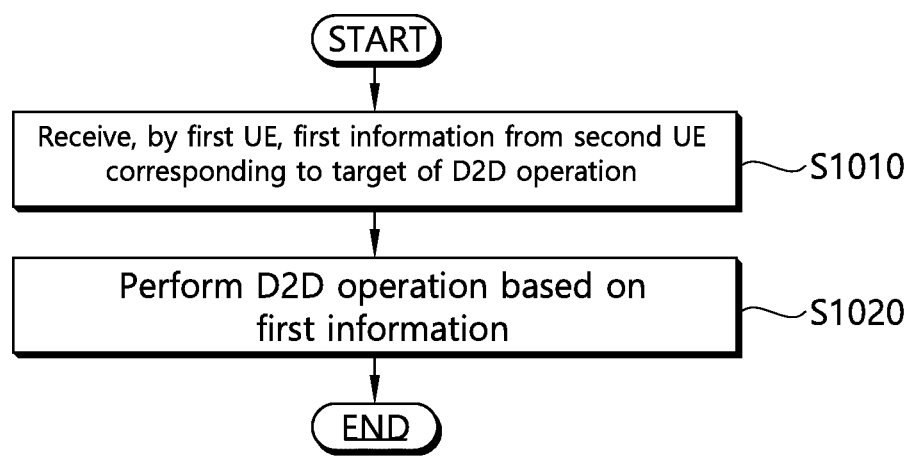
FIG. 10 is a flow chart of a D2D operation method of a UE according to an exemplary embodiment of the present disclosure.

FIG. 10 is a flow chart of a D2D operation method of a UE according to an exemplary embodiment of the present disclosure.

According to FIG. 10, a first UE receives first information from a second UE, which corresponds to a target of the D2D operation (S1010). Herein, the first information may notify a specific resource through which the second UE cannot receive the signal being transmitted from the first UE.

Subsequently, the first UE performs the D2D operation based on the first information (S1020). Herein, the first UE may perform the D2D operation within the remaining resource excluding the specific resource.

Herein, the first UE may have a greater bandwidth capability as compared to the second UE.

Additionally, herein, the specific resource may not include a resource for a Sidelink Synchronization Signal (SLSS), which is transmitted by the first UE.

Additionally, herein, the first UE may determine a time resource pattern based on only the remaining resources excluding the specific resource.

Additionally, herein, the first UE may determine the time resource pattern including the specific resource. However, in this case, the first UE may not perform the D2D operation in a resource where the time resource pattern overlays with the specific resource.

Additionally, herein, the specific resource may include a resource through which a specific signal being equal to or greater than a threshold value is received.

Additionally, herein, the specific signal may correspond to a synchronization signal being transmitted from the base station.

Additionally, herein, when performing the D2D operation, discovery may be performed prior to the communication in a predetermined frequency band.

Additionally, herein, within a predetermined resource, the D2D operation may be performed prior to the uplink communication being performed by the first UE.

Additionally, herein, information on the predetermined resource may be transmitted by the second UE.

Additionally, herein, when performing the D2D operation, if the first UE receives a discovery signal from the second UE via a physical layer, the discovery signal and information on a first resource pool through which the discovery signal is received may be delivered to an upper layer (or higher layer) of the first UE, a discovery model and whether or not to transmit a response signal to the second UE in response to the discovery signal may be determined in the upper layer. Herein, however, when it is determined to transmit the response signal from the upper layer, the response signal and information on a second resource pool that is to transmit the response signal may be delivered to the physical layer.

Additionally, herein, the first UE may select a resource pool that is used for performing the D2D operation, and the first UE may then transmit the selection result to the base station.

Hereinafter, a more detailed description of the exemplary embodiment of the D2D operation method of the above-described UE will be presented below.

Herein, the following proposed methods may be considered.

(Rule #1) A method of notifying DRX-RSC information (e.g., time pattern, cycle/subframe offset, and so on) by the M-UE to the R-UE (or by the R-UE to the M-UE) via a pre-determined signal may be considered.

Herein, for example, DRX-RSC information may be embedded (or included) in a Discovery (e.g., Solicitation) and may then be transmitted, by the M-UE to the R-UE, and, after receiving the corresponding information, the R-UE may restrictedly (or limitedly) select/use the corresponding information, within the remaining resource excluding the DRX-RSC, later on when performing Discovery transmission (e.g., Response) or when performing Communication transmission.

Additionally, herein, for example, the DRX-RSC information may be signaled by the M-UE to the R-UE via PSSCH(/PSCCH) (in addition to the PSDCH).

Additionally, herein, for example, the transmission of the DRX-RSC information may be performed in the form of Scheduling Allocation without data (SA W/O Data), and, in this case, a DRX-RSC pattern may be signaled by the M-UE to the R-UE.

Additionally, herein, for example, the R-UE may notify common DRX-RSC information (or M-UE specific DRX-RSC information) or notify narrow-band common DRX-RSC information (or narrow-band specific DRX-RSC information) to a (plurality of) M-UE(s). (For example, this may have the purpose of efficiently reducing/controlling(/managing) a number of communication suspensions between the R-UE and the (plurality of) M-UE(s).)

Additionally, herein, for example, a specific signal(/channel) transmission resource (e.g., SLSS resource) that is predetermined(/signaled) in advance, between the R-UE/M-UE, may be exceptionally set-up (or processed) to not be configured(/signaled) as DRX-DRC. (For example, this may have the purpose of protecting a signal(/channel) that may have a significant influence in maintaining communication quality/link between the R-UE/M-UE.) Additionally, this may also be extendedly applied to (Rule #3/4).

Additionally, herein, for example, even if a specific signal (/channel) transmission resource (e.g., SLSS resource) that is predetermined(/signaled) in advance is included in the DRX-DRC configuration-wise, the corresponding resource may be excluded (or exception handled) (e.g., the SLSS RX(/TX) operation may be identically maintained).

In other words, a UE (or terminal) having limited frequency bandwidth capability may suspend its D2D operation with another UE due to the above-described diverse reasons. In this case, the other UE may transmit a D2D signal within a resource through which the UE having limited frequency bandwidth capability cannot receive the D2D signal. In order to prevent this situation, the UE having limited frequency bandwidth capability may transmit information on the resource through which the UE having limited frequency bandwidth capability cannot receive the D2D signal to the other UE. When the other UE receives the information, based on the received information, the other UE may transmit the D2D signal within a different resource other than the resource indicated by the UE having limited frequency bandwidth capability. Accordingly, the above-described situation where the D2D operation is being suspended may be prevented. Furthermore, a more power-efficient D2D operation may be performed.

(Rule #2) (In case the above-described (Rule #1) is not applied (i.e., in case R-UE cannot identify (or acknowledge) the DRX-RSC information of the M-UE)), the M-UE may be configured to perform the following operations.

Herein, for example, the M-UE may report, to the R-UE, that the M-UE has failed to receive (part of) the signal transmitted from the R-UE, due to the DRX-RSC. (For example, this may be differentiated from the reception failure caused by a problem of link quality.)

Additionally, herein, for example, since the M-UE has failed to receive the signal, due to the DRX-RSC, the M-UE may transmit, to the R-UE, a message requesting re-transmission. (For example, important information, i.e., system information transmitted from the base station, paging, handover message, and so on, may be re-acquired within a short period of time.)

Additionally, herein, for example, information that has failed to be transmitted, to the M-UE by the R-UE (or to the R-UE by the M-UE), due to the DRX-RSC, may be re-transmitted (within a pre-determined(/signaled) period of time).

In other words, unlike the above-described (Rule #1), the UE having limited frequency bandwidth capability may not transmit information on the resource through which the UE having limited frequency bandwidth capability cannot receive a D2D signal to another UE, which corresponds to the target of the D2D operation. More specifically, the other UE may be incapable of determining (or identifying) the resource through which the UE having limited frequency bandwidth capability cannot receive the D2D signal. Herein, the other UE may transmit the D2D signal within the resource through which the D2D signal cannot be received. In this case, the UE may transmit, to the other UE, reception failure information notifying that the D2D signal has been transmitted within the resource through which the corresponding UE cannot receive the D2D signal. Herein, the reception failure information may be differentiated from the information indicating a reception failure caused by a problem of link quality. In this case, the other UE may re-transmit the D2D signal.

(Rule #3) If the R-UE is capable of signaling in advance, to the M-UE, information on the resource(/pool) that is used when performing communication with the M-UE, a method of enabling the M-UE to use(/configure) only the remaining resources excluding the (time) resource belonging to the corresponding resource(/pool) for the purpose of DRX-RSC may be considered.

In other words, before the UE having limited frequency bandwidth capability transmits the above-described resource information to another UE corresponding to the target of the D2D operation of the UE having limited frequency bandwidth capability, the resource being used by the other UE for performing D2D operations may be notified in advance to the UE having limited frequency bandwidth capability. Herein, the resource may correspond to the subset format of a D2D resource pool. In this case, the UE may perform different operations other than the D2D operation, such as receiving a synchronization signal from the base station within the remaining resources excluding the subset.

(Rule #4) A method of notifying, by the base station, DRX-RSC information between a (specific) M-UE/R-UE pair via a pre-defined signal may be considered.

(Rule #5) (A) When determining a (PSSCH (or PDSCH) related) time resource pattern (T-RPT), the R-UE (or M-UE) may (restrictedly) designate the pattern by considering only the remaining (time) resources excluding the DRX-RSC of the M-UE (or R-UE), or (B) when determining the T-RPT, the R-UE (or M-UE) may (primarily) designate the pattern without considering the DRX-RSC of its counterpart, and (conversely), among the (time) resources being designated as the T-RPT, the receiving M-UE (or R-UE) may omit the reception overlapping with its own DRX-RSC.

Herein, for example, the T-RPT may be repeatedly applied only within the remaining (time) resources within a (data) resource pool, excluding the (receiving UE related) DRX-RSC resource.

In other words, when a relay UE configures a time resource pattern, the time resource pattern may be configured while considering resource information that is transmitted from the UE having limited frequency bandwidth capability (e.g., remote UE), or, after configuring the time resource pattern without considering resource information, in case the time resource pattern and the resource indicated by the resource information overlap, the relay UE may not transmit a D2D signal to the remote UE.

(Rule #6) The DRX-RSC (configured by the M-UE/R-UE/base station) may be designated, so as to include a number(/frequency/cycle/ratio) of receptions of specific signals (e.g., a synchronization signal, paging, system information(SIB/PBCH), (pathloss measurement specific) RS, and so on), which are pre-configured(/signaled) in advance, as much as or more than a pre-determined(/signaled) threshold value. (For example, this may have the purpose of synchronization/pathloss measurement related minimum quality maintenance/insurance.)

In other words, the resource that is used by the remote UE for receiving a specific signal may not be configured as a resource through which the remote UE cannot receive a D2D signal, or the resource that is used for the reception of the specific signal may be configured as a resource that cannot receive the D2D signal within a range that does not cause any influence on the specific signal reception quality. Herein, the range may correspond to a threshold value format that is pre-configured in advance.

Additionally, herein, part of the method or rules that will hereinafter be described may also be applied.

First, a collision between a sidelink transmission/reception and an uplink transmission may be considered. Since it is expected that an uplink transmission does not occur in a remote UE, the collision may not occur in the remote UE during bi-directional relaying. Herein, during uni-directional relaying, the remote UE may perform uplink transmission for the transmission of information related to downlink, such as HARQ-ACK for PDSCH, downlink CSI, and so on. Therefore, the collision may occur in a relay UE. Since the uplink transmission for a relay UE may be well-scheduled by the eNB, uplink transmission may be performed in a subframe where the relay UE does not participate in the sidelink transmission/reception. In order to enable such scheduling to be performed, the eNB may be required to know which resource pool is being used by which relay UE. If the relay UE is given a control function for the resource that is used for performing communication with remote UEs (e.g., when given such function the resource pool of a specific remote UE may be restricted (or limited)), such information may not be automatically available for usage to the eNB.

Therefore, in order to support eNB scheduling that can prevent collision between a sidelink and an uplink, an information exchange method between the eNB and the relay UE may be considered. Herein, more specifically, the eNB may indicate a set of resources that is safe from the uplink transmission. Herein, the relay UE may use the above-described set in order to perform its sidelink communication. Additionally, the relay UE may report the resource set that is being used for its sidelink communication. Herein, the eNB may avoid scheduling uplink transmission within the reported resource. In other words, in order to support eNB scheduling that can avoid collision between the sidelink and uplink of the relay UE, signaling indicating a resource that can be used in the sidelink communication having no interference from the uplink may be supported between the eNB and the relay UE.

Next, a time overlap collision between a downlink reception and a sidelink reception in the remote UE may be considered. The collision may occur as a remote UE has a single reception chain that shall be shared between the downlink reception and the sidelink reception in the remote UE. Most of the time, when a remote UE is connected to a relay UE during a bi-direction relaying operation, the remote UE may not be required to receive a downlink signal/channel. This may be because all of the necessary (or required) downlink information is delivered (or transported) through the relay UE. However, even after the remote UE is connected to the relay UE, the remote UE may be required to perform downlink measurement. More specifically, if the remote UE uses a serving eNB for synchronization reference, the remote UE may require continuous downlink monitoring in order to maintain its synchronization with the serving eNB. Additionally, the remote UE may be required to measure a pathloss from the serving eNB in order to calculate an upper bound of the sidelink transmission. Herein, in order to perform sidelink power control, unless it is indicated by the eNB in a transmit power control (TPC) command, the UE may perform transmission by using a power level that is not greater than a power level, which is calculated based on an open loop between the UE and the eNB. Herein, a maximum power level and open loop power control parameter (P0, alpha) of the sidelink transmission may be configured (or set up) by the eNB. Additionally, herein, a power control parameter (P0, alpha=0) may be pre-configured in advance for an out of coverage operation. Additionally, herein, the UE may not be required to perform monitoring of the downlink.

This may mean that, in order to be ensured with a monitoring time that is sufficient enough to satisfy the minimum requirements for accuracy in synchronization and pathloss measurement, the remote UE may be required to be provided with a constant duration time for performing downlink monitoring.

In other words, in order to allow the remote UE to maintain its synchronization with the eNB (when the eNB is the synchronization reference), or in order to measure the pathloss that is being used for calculating the upper bound of the sidelink transmission power, a predetermined downlink monitoring time may be required to be provided to the remote UE.

Additionally, for example, the following situation may be considered.

In REL-12/13 D2D, as compared to the D2D discovery transmission/reception (TX/RX), the D2D communication TX/RX may (always) be set to a high priority level. Herein, for example, since the M-UE performs selection, link maintenance/management, and so on, of its R-UE based on R-UE discovery DM-RS RSRP measurement, or since the discovery TX corresponds to a relatively long cycle period as compared to the communication TX, it may not be preferable to always de-prioritize the discovery TX/RX.

Herein, the following proposed methods may be considered.

As compared to the Communication TX (and/or RX), the Discovery TX (and/or RX) may be configured(/signaled) at a higher priority level. (For example, the corresponding rule may be (limitedly) applied only to relaying communication between the R-UE and the M-UE.)

Herein, for example, among a plurality of narrow-bands, the application or non-application of the corresponding rule may be differently (or commonly) configured(/signaled). (For example, this may only be applied to a pre-configured (/signaled) anchor narrow-band (e.g., this may be interpreted as a (sub-)band (e.g., SLSS TX/RX (sub-)band), which the R-UE/M-UE is required to most basically (or essentially) transmit/receive).)

In other words, when performing D2D operations between a remote UE and a relay UE, D2D discovery may be configured to have a priority level that is higher than D2D communication. Herein, a specific frequency band in which the D2D discovery has a higher priority level than the D2D communication may be configured.

In order to protect the transmission(/reception) operations performed by the R-UE for the M-UE, resource information (e.g., time pattern, cycle/subframe offset, and so on) (HPS_RSC), wherein the corresponding transmission(/reception) operations are more prioritized than WAN UL TX(/DL RX), may be signaled in advance.

Herein, for example, the HPS_RSC information may be signaled not only to the R-UE but also to the M-UE, and, accordingly, the M-UE may be used for performing selection of an R-UE related sidelink (PC5) transmission(/reception) resource. (For example, within a D2D resource pool, the resource belonging to the HPS_RSC may be excluded from the process of selecting a transmission resource (directed to the R-UE). (For example, this may have the purpose of mitigating the problem of Half-Duplex.) Herein, the application of such rule may be limited only to a pre-defined specific signal transmission.)

Additionally, herein, for example, the corresponding resource information that is preferred by the R-UE may be reported (to the base station).

A UE (e.g., NB-IOT UE) having a capability less than a pre-configured(/signaled) bandwidth threshold value (e.g., 6RB) may be configured to not perform any (Relaying communication related) SLSS transmission(/reception) operation.

Herein, for example, (unlike an in-coverage UE of a different coverage having a relatively higher capability (e.g., MTC UE)) an in-coverage UE of the above-described characteristic may be configured to (always) assume(/view) the base station as a "synchronization source having the highest priority level (HIGHEST SYNCH. SOURCE PRIORITY)".

Additionally, the following configuration may be considered.

In case the R-UE controls(/limits) sidelink communication related resource of the M-UE (within a resource pool pre-configured(/signaled) by the base station), the determined M-UE sidelink resource information may be reported to the base station. (For example, when the base station performs scheduling of the R-UE/M-UE related WAN communication, the base station may efficiently perform the scheduling by avoiding the corresponding resource (that is received from the R-UE.)

In other words, in case the relay UE performs D2D operations with a UE having limited frequency band capability, the relay UE may be capable of controlling the resource that is being used in the D2D operation for the UE having limited frequency band capability. Herein, the resource that can be controlled by the relay UE may correspond to a subset format of a D2D resource pool. Additionally, herein, the relay UE may transmit information on the resource that is being used for the D2D operations to the base station. Herein, the base station may perform scheduling of the WAN communication between the base station and the UEs based on the received resource information. More specifically, when performing the scheduling, the base station may schedule the remaining resources excluding the resource being used for the D2D operation to the WAN communication. Thus, the D2D operations of the UE having limited frequency band capability may be protected.

Additionally, the following configuration may be considered.

When a radio layer (e.g., PHY(/RRC/MAC)) of a specific UE (e.g., R-UE) receives a Discovery message from another UE (e.g., M-UE), the specific UE may forward the received Discovery message to its upper layer (e.g., Application layer), and only the upper layer may be capable of accurately determining (or recognizing) the corresponding received Discovery message model information (e.g., model A/B). At this point, the radio layer may be configured to additionally report, to the upper layer, information on a (narrow-band) pool (index), in which the corresponding Discovery message is received.

In other words, the D2D discovery may be divided into Model A and Model B. Herein, Model A corresponds to a model enabling non-specific UEs monitoring D2D Discovery messages to discover a UE transmitting a D2D Discovery message by having the UE transmitting the D2D Discovery message notify its presence to the non-specific monitoring UEs. Additionally, Model B corresponds to a model enabling a UE transmitting a D2D Discovery message to notify the presence of a UE that the corresponding UE (i.e., the UE transmitting the D2D Discovery message) wishes to discover and enabling the designated UE to transmit a response message to the D2D Discovery message.

Herein, the received Discovery message may be transparent in a physical layer, and the model of the received Discovery message may be determined by an upper layer (e.g., application layer) of the UE that has received the received message.

In other words, in order to determine (or acknowledge) the model of the Discovery message that is received in the physical layer, the UE may deliver or forward the Discovery message to an upper layer. Herein, when the UE delivers the Discovery message to the upper layer, information on the resource pool through which the Discovery message is received may be additionally delivered to the upper layer.

Herein, in case the received Discovery message corresponds to Model B, the upper layer may notify the Response Discovery message, to the radio layer, along with the (narrow-band) pool (index) information through which the Response Discovery message shall be transmitted.

Additionally, herein, for example, in case an RSRP-based Discovery resource pool selection operation is configured, the upper layer may provide a plurality of (narrow-band) pool (index) information, to the radio layer, and the radio layer may select any one of the provided information based on the measured RSRP value.

In other words, in case the received Discovery message is determined by the upper layer as Model A, the UE that has received the Discovery message may not require any separate operation. Meanwhile, in case the determined result corresponds to Model B, the UE that has received the Discovery message may be required to transmit a response message corresponding to the received Discovery message to the UE that has received the Discovery message.

Herein, when the response message is transmitted from the upper layer to a physical layer, information on a resource pool through which the response message is to be transmitted may be additionally to the physical layer. Thus, the UE may be capable of transmitting the response message through the resource that is being monitored by a UE, which is intended to receive the response message, thereby being capable of performing smooth response message transmission and reception.

Therefore, when the model of the Discovery message is determined, in case it is determined that the model of the Discovery message corresponds to Model B, when transmitting the response message, by delivering information on the resource pool through which the response message is to be transmitted to the physical layer along with the response message, smoother D2D operations may be performed without any interference as compared to when transmitting the response message.

Additionally, herein, the above-described exemplary embodiments and the description of the same may be illustrated and described in the viewpoint of a remote UE as presented below.

Figure 11:
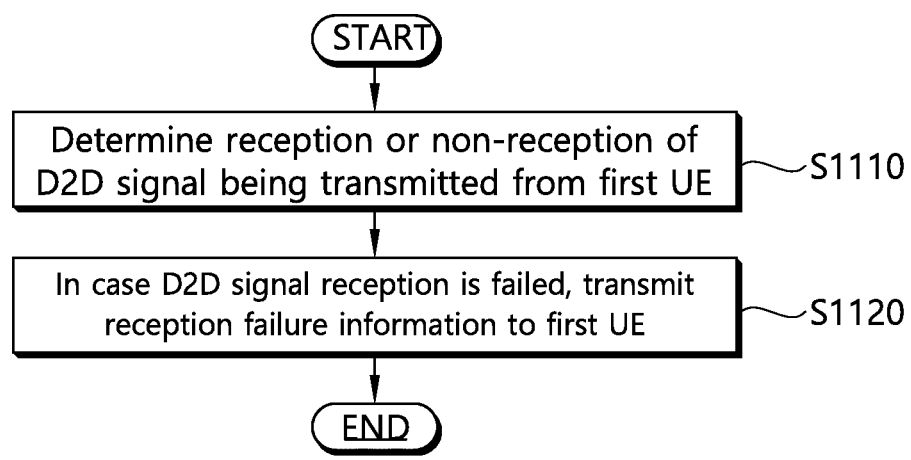
FIG. 11 is a flow chart of a D2D operation method of a UE according to another exemplary embodiment of the present disclosure.

FIG. 11 is a flow chart of a D2D operation method of a UE according to another exemplary embodiment of the present disclosure.

According to FIG. 11, a second UE determines a reception or non-reception of a D2D signal being transmitted from a first UE (S1110).

In case the D2D signal reception is failed, the second UE transmits reception failure information to the first UE (S1120). Herein, the reception failure information may notify a resource in which the second UE cannot perform the D2D operation. Additionally, herein, the reception failure information may be differentiated from a reception failure information that is based on link quality.

Figure 12:
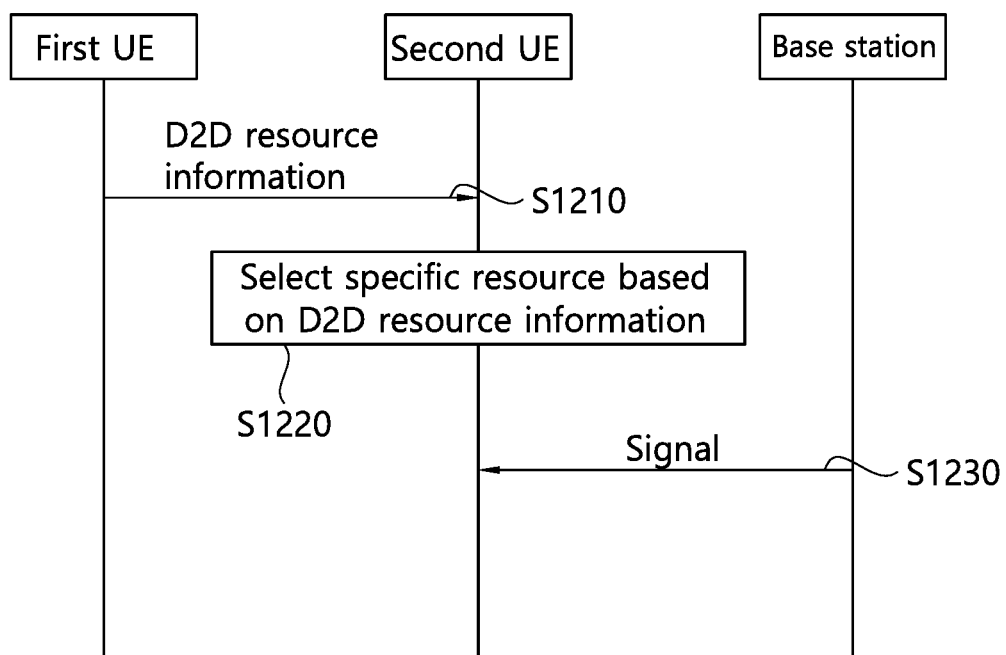
FIG. 12 is a flow chart of a communication method of a UE according to another exemplary embodiment of the present disclosure.

FIG. 12 is a flow chart of a communication method of a UE according to another exemplary embodiment of the present disclosure.

According to FIG. 12, a second UE receives D2D resource information from a first UE (S1210). Herein, the D2D resource information may indicate a resource through which the first UE intends to transmit a D2D signal to the second UE.

Subsequently, the second UE selects a specific resource based on the D2D resource information (S1220). Herein, the specific resource may not be included in the resource indicated by the D2D resource information.

Thereafter, the second UE receives a signal being transmitted by the base station from the specific resource (S1230). Herein, the signal may correspond to a synchronization signal or a reference signal (RS). Additionally, herein, the first UE may correspond to the above-described relay UE, and the second UE may correspond to the above-described remote UE.

Figure 13:
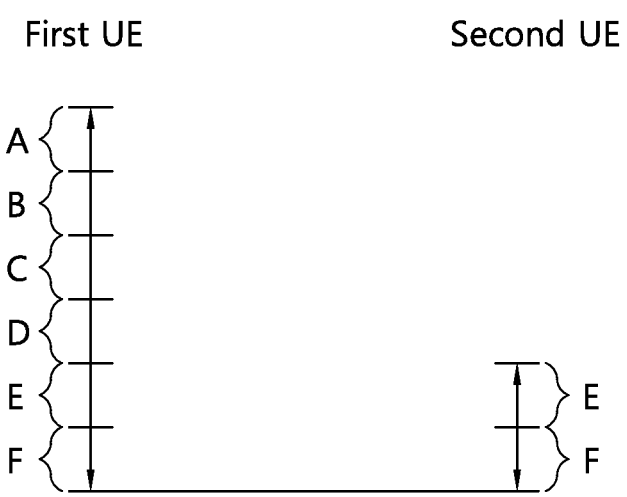

FIG. 13 shows an example for describing an exemplary embodiment to which FIG. 12 is applied.

According to FIG. 13, each of the resources that can be respectively used by the first UE and the second UE may be generally illustrated. More specifically, FIG. 13 illustrates an example, wherein resources corresponding to A, B, C, D, E, F are allocated to the first UE, and wherein resources corresponding to E, F are allocated to the second UE. Herein, the A to F resources may correspond to time resources. Additionally, herein, E and F of the first UE may correspond to the same resource E and F of the second UE, respectively.

Herein, the first UE may transmit D2D resource information to the second UE. Herein, the D2D resource information may indicate a resource through which the first UE intends to transmit D2D resource information to the second UE. Herein, for example, the resource through which the first UE intends to transmit D2D resource information to the second UE may correspond to E. Herein, the first information may indicate E.

Subsequently, the second UE may select a specific resource based on the D2D resource information. Herein, the specific resource may not include the resource indicated by the D2D resource information. Herein, for example, the specific resource that is selected by the second UE may correspond to F.

Thereafter, the second UE may receive a signal being transmitted by the base station from the specific resource. More specifically, the second UE may receive a signal being transmitted by the base station by using the F resource. Thus, the resource that is used for receiving a signal being transmitted from the base station and the resource that is used for receiving a D2D signal may be differentiated from one another, and, as a result, the D2D signal and the signal being transmitted by the base station may be received without any interference.

Since the examples of the above-described proposed methods may also be included as one of the implementation methods of the present disclosure, it will be apparent that the above-described example can be viewed as a type of proposed methods. Additionally, although the above-described proposed methods may be independently implemented, the above-described proposed methods may also be implemented in a combined (or integrated) format of part of the proposed methods.

For example, in the present disclosure, although the proposed method is described based on a 3GPP LTE system for simplicity in the description, the scope of system to which the proposed method can be applied may be extended to other systems apart from the 3GPP LTE system. For example, the proposed methods of the present disclosure may be extendedly applied for D2D communication. Herein, for example, D2D communication refers to a communication method that is performed between a UE and another UE by using a direct wireless channel. And, herein, for example, although the UE refers to a user's terminal (or user equipment), in case a network equipment, such as a base station, transmits/receives a signal in accordance with a communication method between the network equipment and a UE, this may also be viewed as a type of UE. Additionally, for example, (part of) the proposed methods of the present disclosure may also be limitedly (or restrictedly) applied only to MODE 1(/3) D2D(/V2X) operations (and/or MODE 2(/4) D2D(/V2X) operations).

Additionally, for example, (part of) the proposed methods of the present disclosure may also be limitedly (or restrictedly) applied only to a pre-configured(/signaled) (specific) D2D(/V2X) channel(/signal) transmission (e.g., PSSCH (and/or (linked) PSCCH and/or PSBCH)). Additionally, for example, (part of) the proposed methods of the present disclosure may also be limitedly (or restrictedly) applied only to a case where a PSSCH and a (linked) PSCCH are transmitted by being adjacent (and/or non-adjacent) to one another (within a frequency domain) (and/or to a case where a pre-configured(/signaled) MCS (and/or coding rate and/or RB) (value(/range)) based transmission is performed).

Additionally, for example, (part of) the proposed methods of the present disclosure may also be limitedly (or restrictedly) applied only between MODE #1(/3) (and/or MODE

2(/4)) D2D(/V2X) carriers (CARRIER) (and/or (MODE #1(/2)(/4(/3))) SL(/UL) SPS (and/or SL(/UL) dynamic scheduling) carriers).

Additionally, for example, (part of) the proposed methods of the present disclosure may also be limitedly (or restrictedly) applied only to a case where positions and/or number of synchronization signal (transmission (and/or reception)) resources (and/or positions and/or number of D2D(/V2X) resource pool related subframes (sizes and/or number of sub-channels)) between carriers are the same (and/or (partly) different).

Additionally, for example, (part of) the proposed methods of the present disclosure may also be limitedly (or restrictedly) applied only to a uni-directional relaying (and/or bi-directional relaying) related remote UE (and/or relay UE). Additionally, for example, (part of) the proposed methods of the present disclosure may also be limitedly (or restrictedly) applied only to (D2D) communication operations (and/or (D2D) discovery operations).

Figure 14:
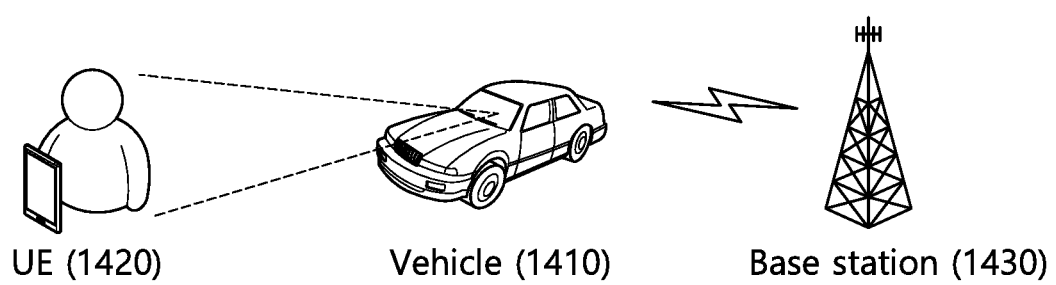
FIG. 14 shows an exemplary scenario in which an exemplary embodiment of the present disclosure may be implemented.

FIG. 14 shows an exemplary scenario in which an exemplary embodiment of the present disclosure may be implemented.

According to FIG. 14, each of a vehicle (1410) capable of performing D2D operations, a UE (1420) of a passenger within the vehicle, and a base station (1430), to which each of the UE and the vehicle may be connected, is generally illustrated. Herein, for example, the above-described relay UE may correspond to the vehicle, and the above-described remote UE may correspond to the UE.

Herein, for example, a message being transmitted to the UE of the passenger may first be transmitted to the vehicle (more specifically, a modem of the vehicle), and, then, the vehicle may transmit the corresponding message to the UE by using sidelink communication.

Meanwhile, although FIG. 14 shows an example of D2D operations between a UE and a vehicle, an exemplary embodiment of the present disclosure will not be limited only to this. And, therefore, for example, the exemplary embodiments of the present disclosure may applied to diverse examples, such as a case of performing D2D operations between a UE and a wearable device, and so on.

Figure 15:
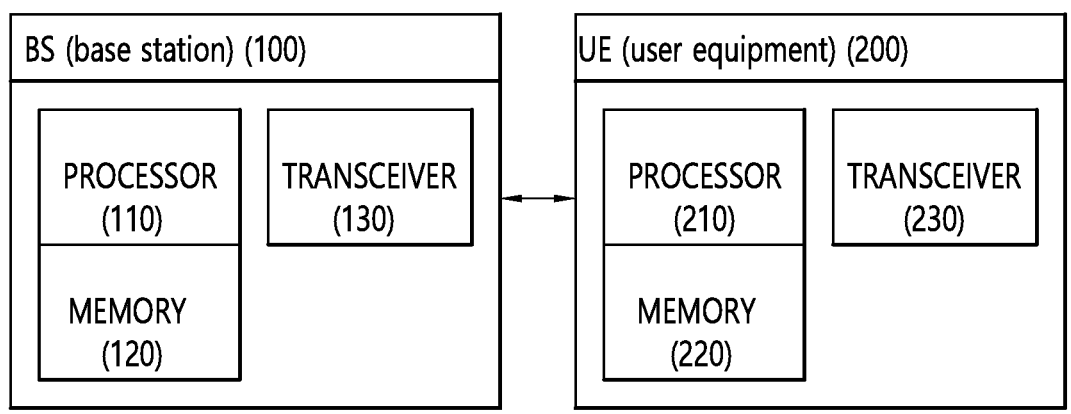
FIG. 15 is a block diagram illustrating a communication device in which an embodiment of the present disclosure is implemented.

FIG. 15 is a block diagram illustrating a communication device in which an embodiment of the present disclosure is implemented.

Referring to FIG. 15, a base station 100 includes a processor 110, a memory 120, and a transceiver 130. The processor 110 implements the proposed functions, processes and/or methods. The memory 120 is connected to the processor 110 and stores various information for driving the processor 110. The transceiver 130 is connected to the processor 110 to transmit and/or receive a radio signal.

A user equipment (UE) (200) includes a processor (210), a memory (220), and a transceiver (230). The processor (210) implements proposed functions, processes and/or methods. The memory (220) is connected to the processor (210) and stores various information for driving the processor (210). The transceiver (230) is connected to the processor (210) and transmits and/or receives radio signals. The UE (200) may perform a V2X communication to another UE according to the above-described method.

The processor (110, 210) may include an application-specific integrated circuit (ASIC), a separate chipset, a logic circuit, a data processing unit, and/or a converter inter-converting baseband signals and radio signals. The memory (120, 220) may include a read-only memory (ROM), a random access memory (RAM), a flash memory, a memory card, a storage medium, and/or other equivalent storage devices. The transceiver (130, 230) may include one or more antennas transmitting and/or receiving radio signals. When the embodiment is implemented as software, the above-described methods may be implemented as a module (i.e., process, function, etc.) for performing the above-described functions. The module may be stored in the memory (120, 220) and may be performed by the processor (110, 210). The memory (120, 220) may be located inside or outside the processor (110, 210) and may be coupled to the processor (110, 210) by using various well-known means.

Figure 16:
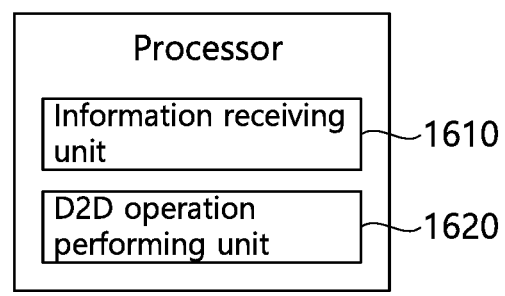
FIG. 16 is a block view showing an exemplary device being included in a processor.

FIG. 16 is a block view showing an exemplary device being included in a processor.

According to FIG. 16, based on its functional aspect, a processor may be configured of an information receiving unit (1610) and a D2D operation performing unit (1620). Herein, the processor may correspond to the processor (110, 210) of FIG. 15.

Herein, a resource information receiving unit may have a function of receiving resource information from another UE, which corresponds to a target of the D2D operations performed by the UE. Additionally, herein, the D2D operation performing unit may have a function of performing the D2D operations based on the resource information.

The description of the device included in the above-described processor is merely exemplary. And, therefore, the processor may further include other functional elements or devices. Additionally, since a detailed example of the operations performed by each of the above-described functional devices has already been described above, repeated description of the same will be omitted for simplicity.

What is claimed is:

1. A device to device (D2D) operation method in a wireless communication system, the method performed by a first user equipment (UE) and comprising:
   receiving first information, by the first UE, from a second UE, the second UE being a target of the D2D operation; and
   performing the D2D operation based on the first information,
   wherein the first information notifies the first UE of a specific resource through which the second UE is incapable of receiving a signal transmitted from the first UE,
   wherein the first UE performs the D2D operation within a number of resources excluding the specific resource, and
   wherein, within a pre-configured resource, the D2D operation is performed at a higher priority level than an uplink communication being performed by the first UE.

2. The method of claim 1, wherein the first UE has a greater bandwidth capability than the second UE.

3. The method of claim 1, wherein the specific resource is not a resource for a Sidelink Synchronization Signal (SLSS) transmitted by the first UE.

4. The method of claim 1, wherein the first UE determines a time resource pattern based on only the number of resources excluding the specific resource.

5. The method of claim 1, wherein the first UE determines a time resource pattern including the specific resource, and
   wherein the D2D operation is not performed in a resource where the time resource pattern and the specific resource overlay one another.

6. The method of claim 1, wherein the specific resource is a resource through which a specific signal having a value equal to or greater than a threshold value is received.

7. The method of claim 6, wherein the specific signal corresponds to a synchronization signal transmitted from a base station.

8. The method of claim 1, wherein, based on the first UE performing the D2D operation, in a pre-configured frequency band, discovery is performed at a higher priority level than communication.

9. The method of claim 1, wherein information on the pre-configured resource is transmitted to the second UE.

10. The method of claim 1,
wherein, based on the first UE performing the D2D operation, and based on the first UE receiving a discovery signal from the second UE through a physical layer, the discovery signal and a first resource pool through which the discovery signal is received are delivered to an upper layer of the first UE,
determining whether to transmit, from the upper layer, a discovery model and a response signal corresponding to the discovery signal, to the second UE is determined, and
wherein, if the response signal is to be transmitted from the upper layer, delivering, to the physical layer, the response signal and information on a second resource pool through which the response signal is to be transmitted.

11. The method of claim 1 further comprising:
selecting a resource pool for performing the D2D operation by the second UE, and
transmitting the selection result to a base station.

12. A device to device (D2D) operation method of a second user equipment (UE) in a wireless communication system, comprising:

determining reception or non-reception of a D2D signal transmitted by a first UE; and
based on non-reception of the D2D signal reception, transmitting reception failure information to the first UE,
wherein the reception failure information notifies the first UE of a resource through which the second UE is incapable of performing the D2D operation, and
wherein the reception failure information is different than reception failure information based on link quality.

13. A user equipment (UE), comprising:
a transceiver configured for transmitting and receiving radio signals; and
a processor operatively coupled to the transceiver, wherein the processor is configured:
to receive first information from another UE, the other UE being a target of the D2D operation, and
to perform the D2D operation based on the first information,
wherein the first information notifies the processor of a specific resource through which the other UE is incapable of receiving a signal transmitted from the UE,
wherein the UE performs the D2D operation within a number of resources excluding the specific resource, and
wherein, within a pre-configured resource, the D2D operation is performed at a higher priority level than an uplink communication being performed by the UE.

14. The UE of claim 13, wherein the UE communicates with at least one of a mobile terminal, a network or autonomous vehicles other than the UE.

* * * * *